United States Patent [19]
Brown et al.

[11] Patent Number: 5,144,418
[45] Date of Patent: Sep. 1, 1992

[54] CRYSTAL STABILIZATION OF AMPLITUDE OF LIGHT VALVE HORIZONTAL SWEEP

[75] Inventors: David W. Brown, Fulton; Terrence E. Rogers, Clay; Richard L. Sundin, Sr.; Ralph A. Henry, both of Liverpool, all of N.Y.

[73] Assignee: General Electric Company, Syracuse, N.Y.

[21] Appl. No.: 629,734

[22] Filed: Dec. 18, 1990

[51] Int. Cl.[5] .......................... H04N 9/31; H04N 5/74
[52] U.S. Cl. ..................................... 358/60; 358/231; 358/180
[58] Field of Search .................. 382/47; 358/51, 87, 358/180, 60, 231, 236, 237

[56] References Cited
U.S. PATENT DOCUMENTS

| | | | |
|---|---|---|---|
| 4,085,425 | 4/1978 | Hamill | 358/180 X |
| 4,385,324 | 5/1983 | Shioda et al. | 358/180 X |
| 5,020,116 | 5/1991 | Macaulay | 358/231 X |

Primary Examiner—James J. Groody
Assistant Examiner—Mark R. Powell
Attorney, Agent, or Firm—Paul Checkovich; Richard V. Lang

[57] ABSTRACT

In one system configuration the size of the horizontal sweep of light valve projection apparatus is regulated from two pulses, one at the start of the sweep and one nominally in the second half of the sweep, wherein the reference signal for determining the regulation pulses is obtained from one of two oscillators. A first keyed voltage controlled oscillator is used as a reference source when color is considered to be a more critical feature and a second free running oscillator is used as a reference source when horizontal size is considered to be a more critical feature, such as when a plurality of side-by-side registered images from a corresponding plurality of projectors are desired. Provision is included for fine adjustment of the horizontal size and frequency of the first oscillator for color control. Operator inputs may be received through an information interface.

12 Claims, 6 Drawing Sheets

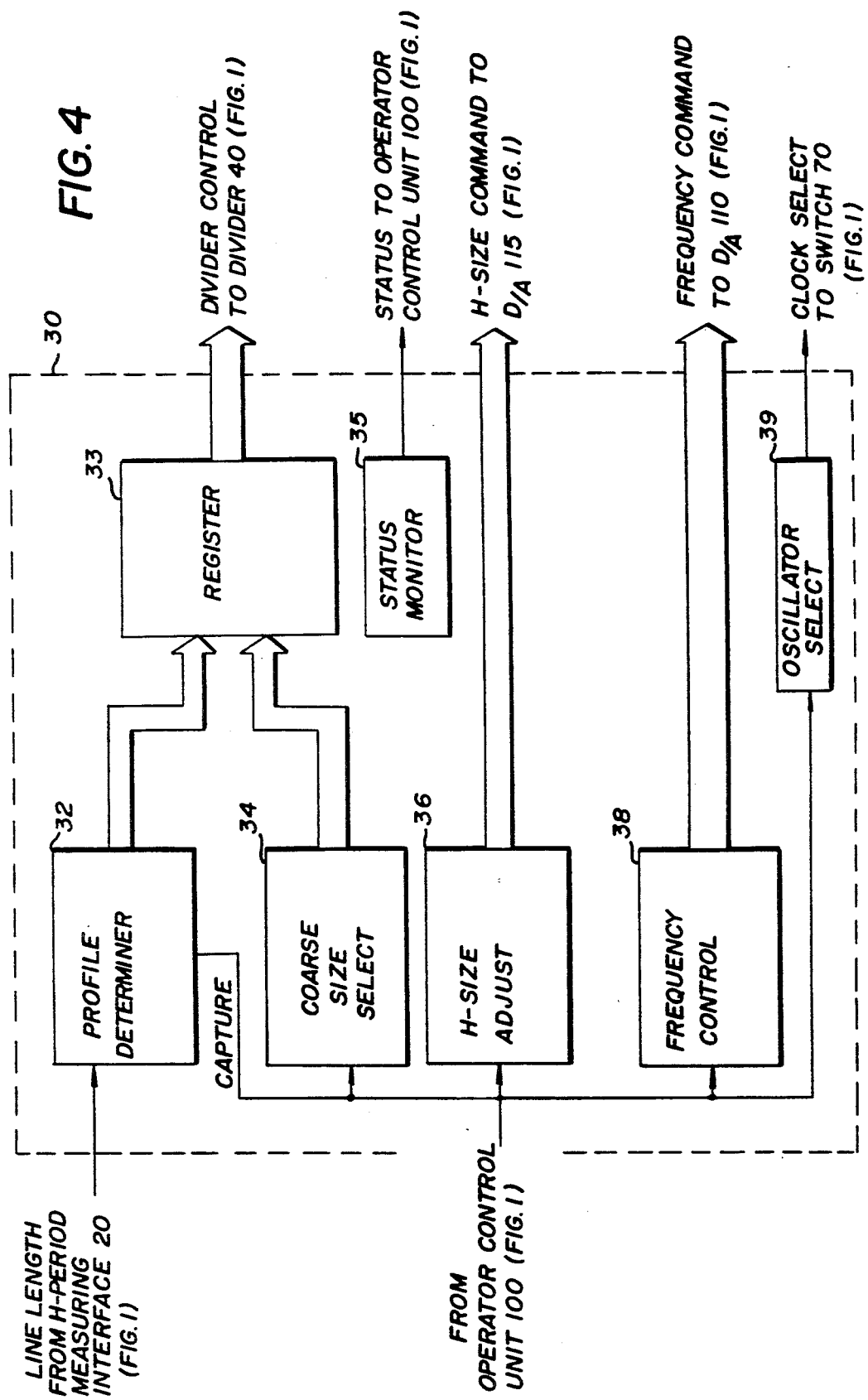

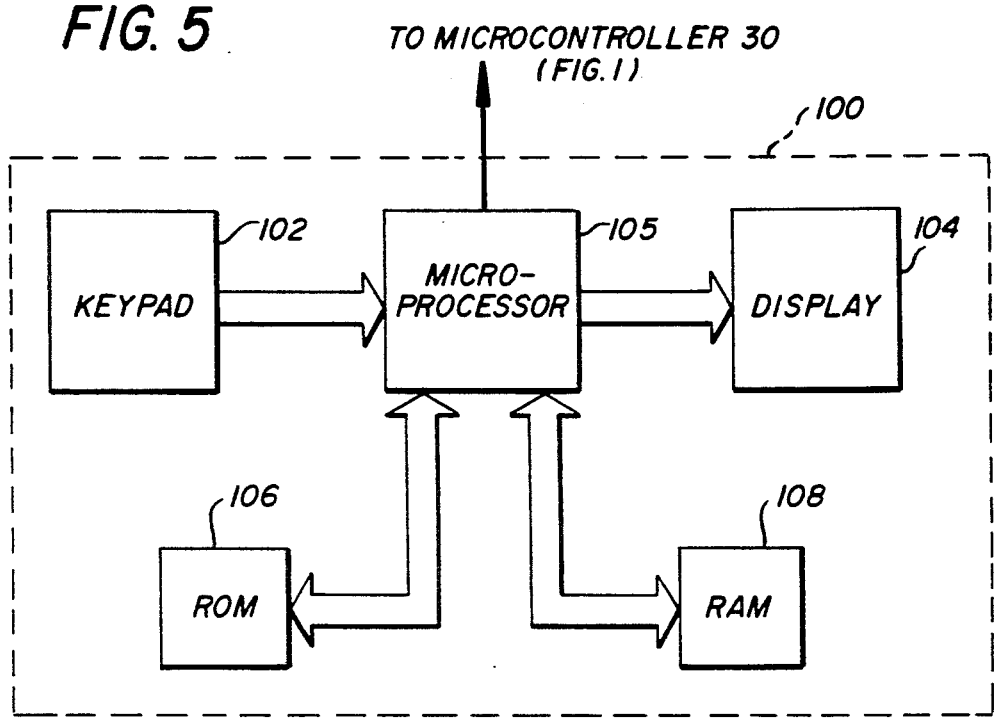
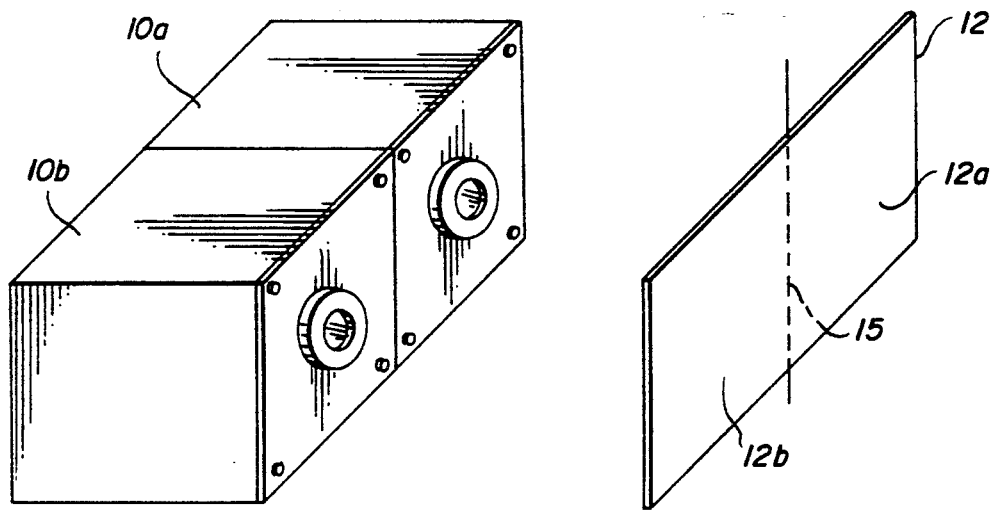

CRYSTAL STABILIZATION OF AMPLITUDE OF LIGHT VALVE HORIZONTAL SWEEP

BACKGROUND OF THE INVENTION

The present invention relates to stabilization of the amplitude of a horizontal sweep signal for projection apparatus, and, more particularly, to crystal stabilization of the horizontal sweep of light valve projection apparatus while also maintaining proper or desired color rendition.

Light valve projection apparatus typically may be employed to project an image onto a display device such as a flat or curved screen, which may include a rear projection screen, the inside of a dome that may be used for pilot training, or other suitable and/or desirable surfaces. The light valve itself generates images to be projected in response to electronic signals that are received from a remote source and are typically arranged so that the image is scanned, such as in a raster, in conformance with a code or standard, such as NTSC (present TV standard in the United States), wherein the horizontal sweep time for one horizontal line is about 63.5 microseconds, or MACII (a computer display format), wherein the horizontal sweep time for one horizontal line is about 27 microseconds.

In certain situations, such as for displaying wide panoramic scenes with fine detail, it may be desirable to use simultaneously more than one projection apparatus for projecting images, with the resulting images being optically, mechanically and electronically directed to abut, and to be in registration with, a corresponding neighboring image along a vertical edge, that is, along the beginning or ending of the horizontal sweeps.

For example, as viewed from the light valves in the direction of projection, the right vertical edge (endings of horizontal sweeps) of a left image may be arranged to abut the left vertical edge (beginnings of horizontal sweeps) of a right image. For these multiple image displays, it is necessary to maintain a constant horizontal size of both the left and right images as projected, otherwise the abutting vertical interface will not be constant and a gap between the desired abutting vertical edges or an excessive overlap between same, or some fluctuation between a gap and overlap nominally in the area of the desired abutment, will occur. Factors tending to cause variation in horizontal size include temperature variations of the light valve and its components, and to a lesser degree aging of the components. Such factors also include temperature and humidity variations of the electronic sweep circuitry, and to a lesser degree aging of the components thereof. In particular, these variations are more severe, but not limited to, high voltage, electrostatic sweep systems.

A present scheme for regulating horizontal (hereinafter referred to as "H") size includes using one of the color carrier frequencies (red, green, blue), for regulating H-size. This scheme maintains constant colorimetry (i.e., exact rendition of received color), but permits the H-size to vary directly with variations in the regulating color carrier frequency. In this scheme it is difficult to regulate the color carrier frequency inasmuch as the color carrier signal generator is keyed to obtain phase coherency of the color carrier signal at the beginning of each raster line and the frequency settling time would interfere with such regulation.

Any attempt to regulate H-size should give consideration to the adverse effects such regulation may have on color rendition and make provisions to compensate therefor. It would also be desirable to have independence between color and H-size adjustments so that the one having more importance for a particular application may be used for exact adjustment while the other adjustment may be used to readjust the secondary condition should any cross-talk or coupling of one adjustment affect the other. Generally color may be considered to be more critical for TV, VCR, etc. type sources, while H-size may be deemed to be more important for simulation type source's. However, it is still desirable to achieve accurate color rendition regardless of the source of data.

Accordingly, it is an object of the present invention to provide apparatus and method for maintaining a constant horizontal size of a raster for an image generated by a light valve projection apparatus.

Another object of the present invention is to provide apparatus and method for maintaining a constant horizontal size of a raster for an image produced by light valve projection apparatus while also maintaining proper and/or desired color rendition of the image.

Yet another object of the present invention is to provide apparatus and method for maintaining a constant horizontal size of the raster while maintaining proper and/or desired color rendition wherein the size may be adjusted as desired.

SUMMARY OF THE INVENTION

In accordance with the present invention, in a video projection system, apparatus for establishing a horizontal size of a display raster in response to information for a display to be presented, the information including synchronization data indicative of a commanded horizontal size of the display raster, comprises first reference signal generating means for generating a first reference signal having a predetermined frequency, divider means for dividing down the first reference signal in response to the synchronization data for forming a secondary reference signal, counter means for generating first and second sampling signals after a respective first and second predetermined number of cycles of the secondary reference signal and horizontal sweep generator means for generating a horizontal sweep signal in response to the first and second sampling signal.

The divider means may include a programmable divider and the apparatus may further include a microcontroller for generating divider control signals for programming the programmable divider in response to the synchronization data. The microcontroller may effectively alter the detected time interval between the first and second sampling signals, such as by controlling the value of an offset voltage for a sweep signal voltage sampling circuit, for effecting a change in the horizontal sweep.

The apparatus may further include second reference signal generating means for generating a second reference signal having a predetermined frequency, switch means have respective input ports connected to the outputs of the first and second reference signal generating means and an output port connected to the input of the divider means, and microcontroller means for controlling the frequency of the second reference signal to regulate the horizontal size of the display raster when the second reference signal is supplied to the divider means.

Then the first reference signal is supplied to the divider means and the second reference signal is provided as an RF carrier signal to be modified, the control of the frequency of the second reference signal will affect color rendition at the display, while the microcontroller may also control horizontal size of the display raster by effectively altering the detected time interval between the first and second sampling signals.

In another aspect of the present invention, in a video projection system, a method for establishing a horizontal size of a display raster, comprises the steps of receiving a series of synchronization signals responsive to a video signal to be displayed, wherein the interval between predetermined synchronization signals is indicative of the length of a horizontal line of the raster; dividing down the frequency of a first reference frequency signal to form a secondary reference signal; generating a first and second sampling signal after a respective first and second predetermined number of cycles of the secondary reference signal; and, generating a horizontal sweep signal in response to the first and second sampling signal, wherein the horizontal sweep signal is indicative of the horizontal size of the display raster.

The method may further include dividing down in response to the synchronization signals and/or in response to operator selected commands. The detected interval between the first and second sampling signal may be effectively modified, such as by incorporating an offset voltage into a sampled voltage of the H-sweep signal for controlling the slope of horizontal sweep signal, and thereby the H-length of a line of the display raster.

A second reference signal may be used to provide the RF carrier signal so that both the H-size and color rendition may be controlled independently of each other, when the first reference signal is counted down. The second reference signal may be used for both the RF carrier signal and the signal to be divided down, in which case changing the frequency of the second reference signal will control H-display raster size while color rendition remains constant.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 4 is a functional block diagram of the microcontroller of FIG. 1.

FIG. 5 is a block diagram of the operator control unit of FIG. 1.

FIG. 7 is a perspective diagram of a plurality of light valve projectors which may beneficially employ the present invention.

DETAILED DESCRIPTION

Figure 1:
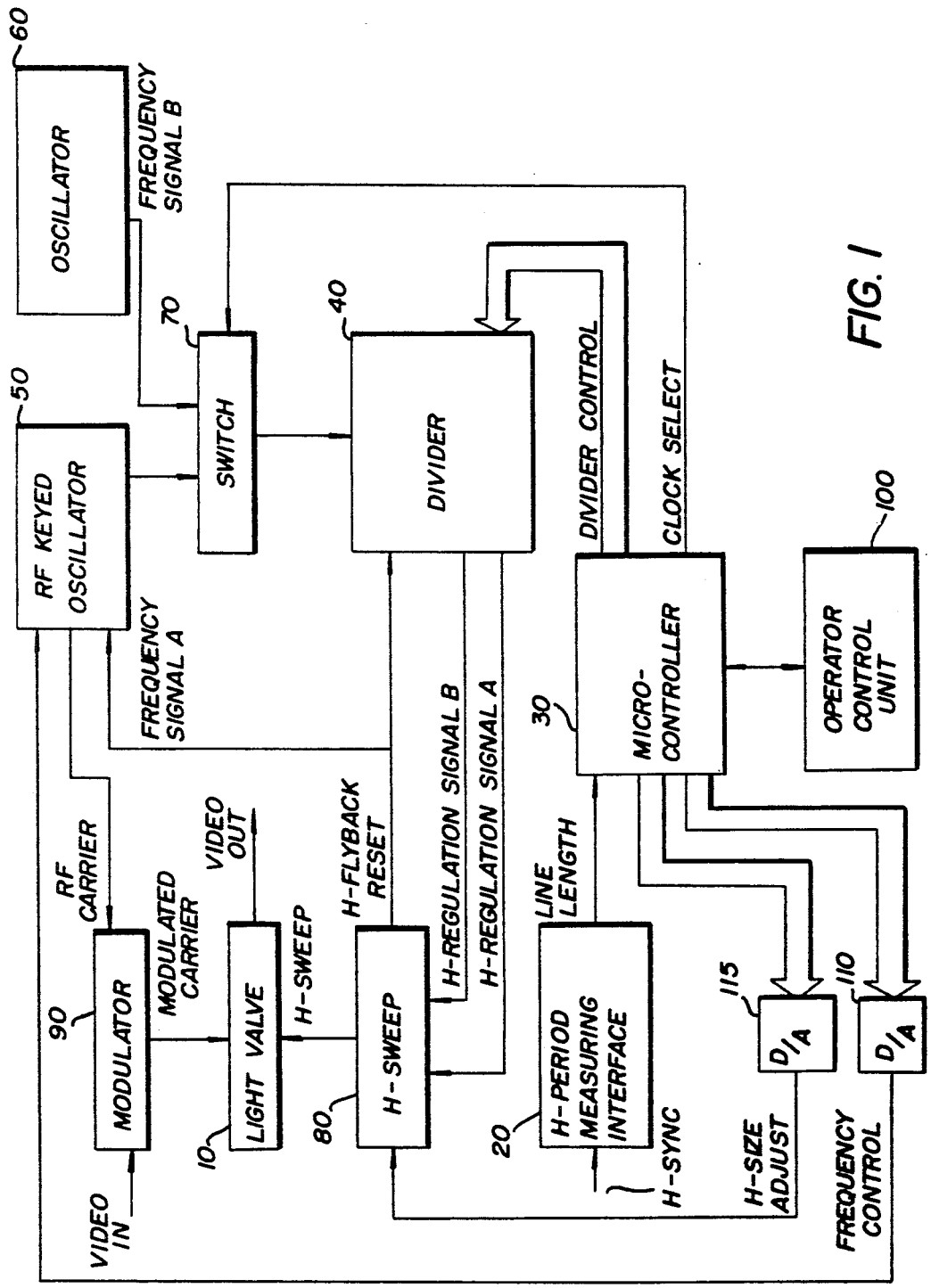
FIG. 1 is a block diagram of control circuitry for horizontal size and color control of light valve projection apparatus in accordance with the present invention.

Referring to FIG. 1, a block diagram of control circuitry for horizontal size and color control of light valve projection apparatus in accordance with the present invention, is shown.

The control circuitry comprises an RF keyed voltage controlled oscillator (VCO) 50 and a free-running oscillator 60, each having an output coupled to a respective input of switch means 70, divider circuitry 40, having an input coupled to the output of switch means 70, and H-sweep generator means 80 having a pair of inputs coupled to a respective pair of outputs of divider circuitry 40.

Modulator circuitry 90 includes an input coupled to another output of oscillator 50 for receiving a modulated carrier signal and another input coupled for receiving a video input signal from a remote source. Projection means 10, such as a light valve, has respective inputs coupled to an output of modulator circuitry 90 and H-sweep generator means 80 for generating a video signal, which is available at the output of light valve 10, in response to the H-sweep signal from H-sweep generator means 80 and the modulated carrier signal from modulator 90.

The modulated carrier signal is indicative of the RF carrier signal as modulated by the video input signal from the external source. The RF carrier signal may be the same frequency as a frequency signal A that is available from oscillator 50. More details regarding modulation of the RF carrier signal may be had by reference to U.S. Pat. No. 3,730,992—True which is assigned to the assignee hereof.

The control circuitry also comprises microcontroller means 30, such as a programmable general purpose microprocessor, having an input/output (I/O) interface coupled to a corresponding I/O interface of operator control unit 100, H-period measuring interface circuitry 20, having an output coupled to an input of microcontroller means 30 for supplying a H-line length signal thereto in response to the H-synchronization (H-Sync) signal provided to an input of H-period measuring interface circuitry 20, and a pair of digital-to-analog (D/A) converter means 110 and 115, having an output coupled to an input of oscillator 50 and H-sweep generator means 80, respectively, for supplying a frequency control signal and an H-size adjust signal, respectively, thereto. Both the frequency control and H-size adjust signals are provided in analog format in response to a corresponding digital command signal that is supplied from a respective output of microcontroller means 30 to the input of D/A converter means 110 and 115.

Microcontroller 30 also supplies a divider control signal in digital format from another output thereof to another input of divider circuitry 40 and a clock select signal from yet another output thereof to yet another input of switch 70. Microcontroller 30 may be pre-programmed to provide the appropriate divider control signal in response to the source and type of video received for creating an image, or may generate the divider control signal in response to operator inputs from operator control unit 100. In either case, microcontroller 30 may provide signals representative of the status of the divider control signal and clock select signal to operator control unit 100 for ultimate display or other human perceptible indication to an operator.

Switch 70 may include a single-pole, double throw type mechanical or electronic switch, or the like, having a common terminal or port, which constitutes the output of switch 70. One switch terminal or port, constituting an input of switch 70 and that may be selectably connected to the common terminal, is coupled to an output of RF oscillator 50 for receiving frequency signal A, while the other terminal or port, constituting another input of switch 70 and that may be selectably connected to the common terminal, is coupled to the output of oscillator 60 for receiving a frequency signal B. The operation of switch 70 is controlled by the clock select signal that is supplied by microcontroller means 30 so that either frequency signal A or frequency signal B is made available at the output of switch means 70.

Frequency signal A is proportional to the desired H-line active video length and may range from about 16 MHz for NTSC formatted input data to about 40 MHz for MACII formatted input data. Frequency signal B may be about 14.318 MHz, regardless of the format of input data. The frequency of frequency signal B is selected to be below the frequency at which oscillator 60 will produce overtones yet still be high enough to keep phase jitter small. In accordance with the present invention, generally frequency signal A is selected by microcontroller 30, or by the operator, as the primary reference signal for processing by divider circuitry 40 when exact color rendition is considered to be a critical parameter, while frequency signal B is selected by microcontroller 30, or by the operator, as the primary reference signal for such processing when horizontal size is considered to be a critical parameter.

Oscillator 50 may include a voltage controlled oscillator (VCO) with a keying, or reset, input for ensuring that frequency signal A from VCO 50 always starts at a predetermined frequency value and in a predetermined phase at the beginning of a horizontal line, while controlled oscillator 60 may include a free-running crystal controlled oscillator that may be temperature compensated (TCXO) for maintaining stability. In addition, the RF carrier signal supplied to modulator 90 may be from the same internal source of oscillator 60 as, but be separately buffered from, frequency signal A so that both frequency signal A signal and RF Carrier signal are at the same frequency and are locked to change frequency in tandem. That is, the frequency control signal from D/A 115 also changes the frequency of the RF Carrier signal. Typically, frequency signals A and B will be substantially greater, such as about several orders of magnitude (each order of magnitude being ten times a previous order of magnitude) than the actual frequency of a signal required by divider circuitry 40 for generating H-regulation signals A and B. Frequency division, or reduction, of frequency signal A or B by divider circuitry 40, provides a signal that is related to the corresponding frequency A or B but at a lower frequency so that the operating frequency demands on the downstream, components of divider circuitry 40 are not so severe.

At the end of a horizontal sweep of a line of an image to be displayed, H-sweep generator means 80 generates a flyback, or reset, signal that is supplied to both oscillator 50 for keying, or ensuring that frequency signal A starts at a predetermined value and direction at the beginning of a next horizontal line sweep, and to divider circuitry 40 for resetting all counters and/or dividers to a predetermined state in order to be in condition to generate regulation signals A and B for the next horizontal line sweep.

H-period measuring interface circuitry 20 receives the H-sync signal from a remote signal source, such as a video tape recorder, off-air or broadcast signal through a tuner to form base band video, or image generator (simulator), and generates a H-line length signal that is available at its output and supplied to microcontroller 30. The H-line length signal includes an indication of the length or overall interval between a predetermined number of H-sync pulses. H-period measuring interface circuitry 20 may include a phase locked loop circuit, for supplying the line length signal to microcontroller 30 in response to a predetermined number of pulses of the H-sync signal. Microcontroller 30 determines the average length of a horizontal line based on the number of pulses, of the H-synch signal counted by H-period circuitry 20 and uses the average line length signal for determining the value of the divider control signal.

Figure 2:
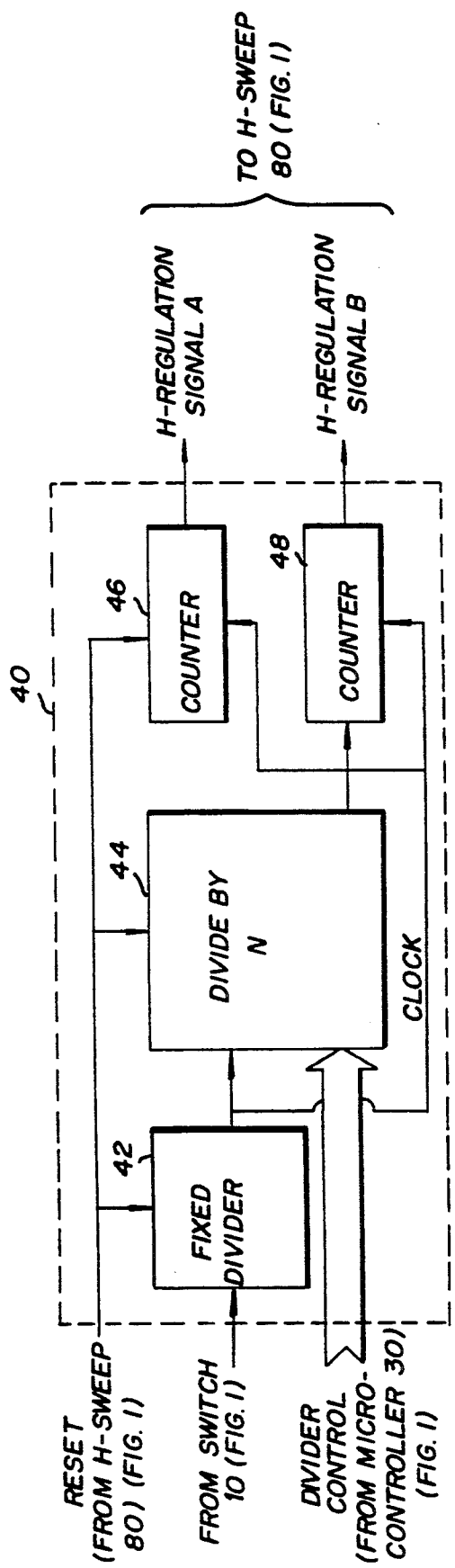
FIG. 2 is a block diagram of the divider circuitry of FIG. 1.

Referring to FIG. 2, a block diagram of divider circuitry 40 in accordance with the present invention is shown.

Divider circuitry 40 includes fixed divider circuitry 42, such as a divide-by-four circuit, having an input which constitutes an input of divider circuitry 40 for receiving through switch 70 frequency signal A or B from oscillator 50 or 60, respectively, (FIG. 1), and variable, or programmable, divider circuitry 44, such as a divide by N circuit, wherein N is a variable, or programmable value. Variable divider circuitry 44 includes an input coupled to the output of divider circuitry 42 and another input for receiving the divider control signal from microcontroller 30. The value of N is selectable in response to the value of the divider control signal for accommodating different horizontal rates and sizes. Depending on the frequency values selected by the designer for frequency signals A and B that are available from oscillators 50 and 60, which may typically be about 16 to about 40 MHz, and 14.38 MHz, respectively, fixed divider circuitry 42 may divide by a different value from four, or may not be needed at all, in which case the frequency signal input from switch 70 to divider circuitry 40 may be directly connected to the frequency signal input of divide by N circuitry 44. The signal available at the output of fixed divider 42 is derived by division from frequency signal A or B available at an input to fixed divider 42 and thus has a frequency equal to the inverse of the division factor of fixed divider 42 times the frequency of frequency signal A or B. Alternatively, divider 42 may provide an output sequence of pulses, wherein each pulse is indicative of N cycles of the input signal.

Divide by N circuitry 44 accepts from fixed divider 42 a signal of a reduced frequency that is derived from frequency signal A or B and further reduces the frequency, or number of pulses, by a factor of N. The resulting signal is supplied to a counter, or decoder, 48 which generates the H-regulation pulse B in response thereto.

Counter 48 counts a predetermined number of cycles, or pulses, of the signal received from the output of divide by N circuitry 44, at the end of which number of cycles, or pulses, it generates a pulse constituting H-regulation pulse B. Typically the number of cycles, or pulses, counted by counter 48 is selected so that H-regulation pulse B occurs just past the center in the second half of a horizontal line of the display raster. Of course, other positions for H-regulation pulse B may be chosen by appropriately configuring counter 48 as desired.

Divider circuitry 40 also receives the H-flyback, or reset, signal from H-sweep generator means 80 (FIG. 1) which is supplied to dividers 42 and 44 and to a counter 46, for resetting dividers 42 and 44, and for stimulating counter 46 to generate H-regulation pulse A in response thereto. H-regulation pulse A indicates the start of the sweep for a horizontal line. Counters 46 and 48 also have a respective input coupled to the output of fixed divider 42 for performing their counting function in synchronization with the signal available from fixed divider 42.

Figure 3:
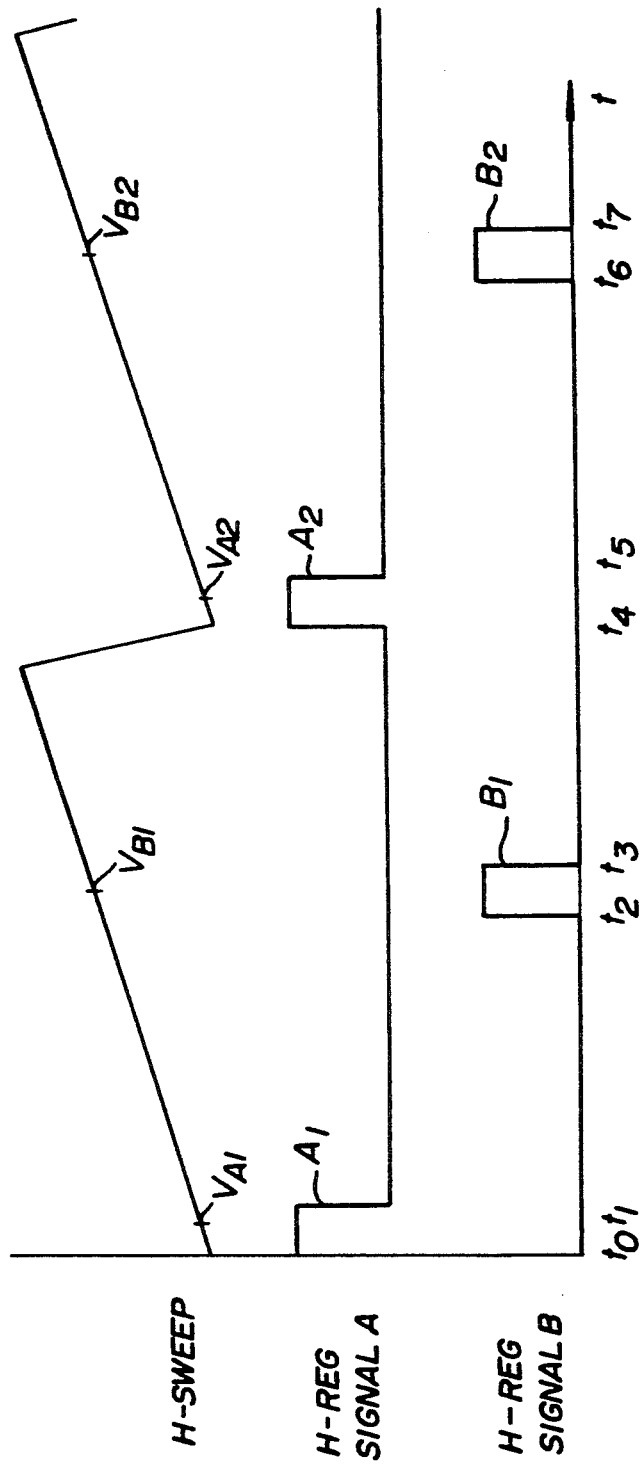
FIG. 3 is a graphic representation of a regulation signals and associated horizontal sweep signal useful with the present invention.

Referring to FIG. 3, a graphic representation of regulation signals and associated horizontal sweep signal useful with the present invention is shown.

Regulation signals A and B are available from respective outputs of divider circuitry 40. For the two cycles of regulation signals A and B that are shown, each cycle (which is indicated by a subscript) contains two pulses such as $A_1$ and $B_1$, $A_2$ and $B_2$, with pulse A occurring at the beginning of the cycle and pulse B occurring after the middle of the same cycle. The interval between pulses A and B is not critical, and pulse B may even occur at or before the middle of the cycle. However, for providing an adequate regulation reference to H-sweep generator means 80 (FIG. 1), the illustrated relationship is preferred. The duration of a cycle is equivalent to the duration of the horizontal sweep for one line of the display. That is, for example, a cycle may extend from $t_0$ to $t_4$ with the voltage ramp of the H-sweep signal likewise extending from $t_0$ to $t_4$.

H-sweep generator means 80 is responsive, for example, to the trailing edge of pulses A and B, and in order that the H-size as determined by H-sweep generator means 80 remain constant, it is necessary to maintain the interval between the trailing edges of the pulses A and B of a same cycle constant. That is, the interval from $t_1$ to $t_3$ and the interval from $t_5$ to $t_7$ must be constant. In other words, H-sweep generator means 80 develops the H-sweep signal in response to the interval between the trailing edges of the A and B pulses of the H-regulation signals of a same cycle. As the interval changes, the slope of the H-sweep signal and thereby the overall horizontal length of a raster line changes directly therewith.

The H-sweep signal, which typically is a ramp voltage waveform, is sampled during the interval of the A and B pulses to obtain sample voltage values $V_A$ and $V_B$, respectively. Voltage values $V_A$ and $V_B$ are processed by H-sweep generator means 80 for regulating the slope of the H-sweep ramp and therefore the horizontal raster size. The horizontal raster size may be finely adjusted by the H-size adjust signal that is available from D/A converter 115.

Referring again to FIG. 1, microcontroller means 30 supplies command, or trimming, signals, in digital format to D/A converters 110 and 115 in response to operator inputs that are supplied to microcontroller means 30 through operator control unit 100. The output of D/A converter 110 has available an H-size adjust signal in analog format that is supplied to H-sweep generator means 80, wherein the amplitude of the H-size adjust signal provides fine control of the size, or raster line length, of the horizontal sweep.

Regulation signals A and B that are supplied from divider circuitry 40 to H-sweep generator means 80 in response to either frequency signal A or B may be considered as providing coarse control of the size of the horizontal sweep, because regardless of the resolution of the finest division of frequency available from divider circuitry 40, such division is provided in discrete increments. The H-size adjust signal permits the interval between corresponding parts of H-regulation signal A and B of a same cycle, which is indicative of H-sweep size, to be varied in finer increments than are available from divider 40, thus providing fine control of the raster line length of a horizontal sweep. With reference to FIG. 3, this means that the H-size adjust signal varies the target voltage difference $V_{B2}-V_{A2}$, which is equivalent to varying the interval between $t_1$ and $t_3$, and permits the H-size to be varied in finer increments than are available from H-regulation signals A and B.

The output of D/A converter 115 has available in analog form a frequency control signal that is supplied to VCO 50 and which is used as the frequency control voltage of VCO 50. The amplitude of the frequency control signal determines the frequency of frequency signal A that is available from oscillator 50. Generally a VCO will be selected to operate at a nominal frequency and the control voltage will permit the output frequency to be variably selected, plus or minus a predetermined percentage, typically about 2% of the output frequency, while still maintaining operation within a predetermined accuracy.

When color rendition is considered to be the more critical feature, then the frequency signal A from oscillator 50 is selected by switch 70 as the primary oscillator reference signal. The frequency control menu may be selected and operator inputs to control unit 100 for ultimately controlling the value of the frequency control signal that is supplied to oscillator 50 may be used for fine adjustment of the H-size of the raster lines by altering the frequency of the frequency signal A and of the RF carrier signal supplied by oscillator 50 to modulator 50.

It is noted that when frequency signal A from oscillator 50 is selected as the primary oscillator reference signal, altering the frequency of frequency signal A will affect H-size of the raster lines while color rendition remains constant. In this mode, constant color rendition is maintained despite variations in the frequency of frequency signal A because both modulator 90 (having the RF carrier signal whose frequency varies directly with frequency signal A provided thereto) and H-sweep generator means 80 (having regulation signals A and B which are derived from divided down frequency signal A provided thereto) are effectively locked to frequency signal A. Thus a percentage change of the frequency of frequency signal A from a predetermined value will cause a corresponding equal percentage change on the signals processed by modulator 90 and H-sweep generator means 80, whose output signals, when further processed will frequency track or produce the same color rendition commands as were obtained from when frequency signal A was at the predetermined value.

When horizontal size is considered to be the more critical feature, then frequency signal B from oscillator 60 is selected by switch 70 as the primary oscillator reference signal. The H-size adjust menu may be selected and operator inputs to control unit 100 for ultimately controlling the value of the H-size adjust signal that is supplied to H-sweep generator means 80 may be used for fine adjustment of the H-size of the display. The frequency control menu may then be selected and operator inputs to control unit 100 for ultimately controlling the value of the frequency control signal that is supplied to oscillator 50 may be used for fine adjustment of the color rendition of the display by altering the frequency of the signal supplied by oscillator 50 to modulator 90. The H-size adjust and frequency control menus may be alternately selected and corresponding features of the display altered until a desired display is achieved.

Referring to FIG. 4, a functional block diagram of the microcontroller of FIG. 1 is shown.

Microcontroller 30 includes a register 33, coarse size select function generator 34, H-size adjust function generator 36 frequency control function generator 38 and status monitor function generator 35, each of which functions may be implemented and performed by appropriate programming of a microprocessor. The microprocessor, such as a model 68CH11 microcomputer available from Motorola, or the like, is interconnected for synchronizing and controlling operation among the components and functions of microcontroller 30, and for formatting information that is received by microcontroller 30 from operator control unit 100 and formatting information that is supplied by microcontroller 30 to control unit 100, divider 40, and D/A converters 110 and 115.

H-size adjust and frequency control function generators 36 and 38 receive data in serial format from control unit 100 (FIG. 1) and reformat it in parallel data format. Parallel data from H-size adjust 36 and frequency control function generators 36 and 38 are supplied to corresponding outputs of microcontroller 30 and ultimately to D/A converters 115 and 110 (FIG. 1), respectively.

The line length signal is provided to the input of a profile determiner function generator 32, which constitutes an input of microcontroller 30. Profile determiner 32 generates a plurality of divider control command signals that are supplied to a corresponding plurality of inputs of register 33. Another plurality of inputs of register 33 are provided with a corresponding plurality of coarse size select command signals from coarse size select 34. Coarse size select 34 reformats data received from operator control unit 100 as the coarse size select command signals. The coarse size select command signals modify the divider control command signals from profile determiner 34 and the resultant signals are supplied by register 33 from its outputs, which constitute outputs of microcontroller 30, to divider control 40 as the divider control signals.

During operation, such as at initial start-up or when commanded from operator inputs through operator control unit 100 by the capture signal, profile determiner 32 determines the length of a horizontal line, such as by establishing the number of predetermined clock signals, or pulses, between predetermined events of the line length signal received from H-period measuring interface circuitry 20 (FIG. 1), such as may be indicative of the starting times of sequential horizontal sweeps, as may be represented by a synchronization signal, or pulse, received from a remote source. Appropriate divider control command signals are supplied to register 33 in response to the determined line length and the frequency of oscillator 50 or 60 (FIG. 1) that is selected as the source of frequency signal A or B that is selected as the reference signal by switch 70 (FIG. 1). Profile determiner 32 may include a table look-up which uses the determined line length as the address for accessing the appropriate divider control command signals that have been pre-programmed in the table look-up. Alternatively, profile determiner 32 may process the H-line length, such as by scaling and adding an offset to obtain the appropriate values of the divider control command signals that correspond to the H-line length.

Microcontroller 30 also includes oscillator select function generator 39, such as a pre-programmed portion of the microprocessor that senses an input signal from operator control unit 100 and issues a value of the clock select signal to switch 70 (FIG. 1) for selecting the desired output from oscillator 50 or 60 (FIG. 1) as the primary reference signal. Alternatively the value of the clock select signal may be factory pre-set based on user requirements.

Status monitor circuitry 35 of microcontroller 30 monitors the output signal values from each of function generators 32, 34, 36 and 38, register 33, and oscillator select 39 and provides an indication thereof in appropriate format to operator control unit 100 (FIG. 1), wherein selection of an appropriate menu permits display of such values.

Referring to FIG. 5, a block diagram of the operator control unit of FIG. 1 is shown.

Operator control unit 100 includes a general purpose microprocessor 105, such as a model 6303, available from Hitachi, or the like, having a set of inputs connected to a corresponding set of outputs of a keypad 102, and a set of outputs connected to a corresponding set of inputs of display 104, and another output, which constitutes the output of control unit 100 connected to an input microcontroller 30 (FIG. 1). Control unit 100 also includes a read only memory (ROM) 106 and a random access memory (RAM) 108 each having an information port connected to a corresponding port of microprocessor 105.

The interconnections between components of control unit 100 are shown as being in parallel format. Serial format for such interconnections may be used where desired.

Display 104 may include a backlit liquid crystal diode (LCD) display for displaying selectable functions, such as menus and parameter values to the operator. Menus associated with the present invention include a first size control menu which relates to the H-size adjust feature, a second size control menu which relates to the divider control feature and a frequency control menu which relates to the H-size adjust feature. Parameter values associated with these features may also be displayed.

Menus may be selected and parameter values may be monitored and/or changed by operator influenced inputs to microprocessor 105 from keypad 102. Keypad 102 may include a plurality of switches, such as for inputting discrete numeric values as well as ones for increasing and/or decreasing selected parameters. A currently employed keypad is a hand held device that is about two inches thick, slightly larger in length and width than a conventional remote channel/function selector for TV or VCR, and includes a cable or umbilical cord of a predetermined length for connection to microcontroller 30.

Microprocessor 105 supplies information from control unit 100 to microcontroller 30 in a format that is expected to be received by microcontroller 30, while accepting information from microcontroller 30 and reformatting it as necessary for presentation by display 104.

ROM 106 may include menus and associated instructions stored therein for ready access by microprocessor 105 in order to program microprocessor 105 for the appropriate action when operator inputs from keypad 102 are received in response to selected menu commands. RAM 108 may include storage for communication buffers, selected menu position and status, information to be displayed on display 104.

In operation, microcontroller 30 determines the status of switch 70 for selecting either frequency signal A from oscillator 50 or frequency signal B from oscillator 60 as the primary oscillator input signal for the control circuitry. Divider circuitry 40 is configured by the divider control signal that is supplied from microcontroller 30, which control signal may be either determined by microcontroller 30 or operator controlled by selected control circuitry inputs to microcontroller 30 through operator control unit 100.

Divider circuitry 40 generates the H-regulation signals A and B as herein before described. The effect of the H-regulation signals A and B on H-sweep generator means 80 may be altered by the H-size adjust signal which is supplied in response to operator inputs through operator control unit 100 to microcontroller 30. Likewise the frequency of oscillator 50 may be adjusted for controlling color rendition by the frequency control signal that is generated in response to operator inputs through operator control unit 100 to microcontroller 30.

Figure 6:
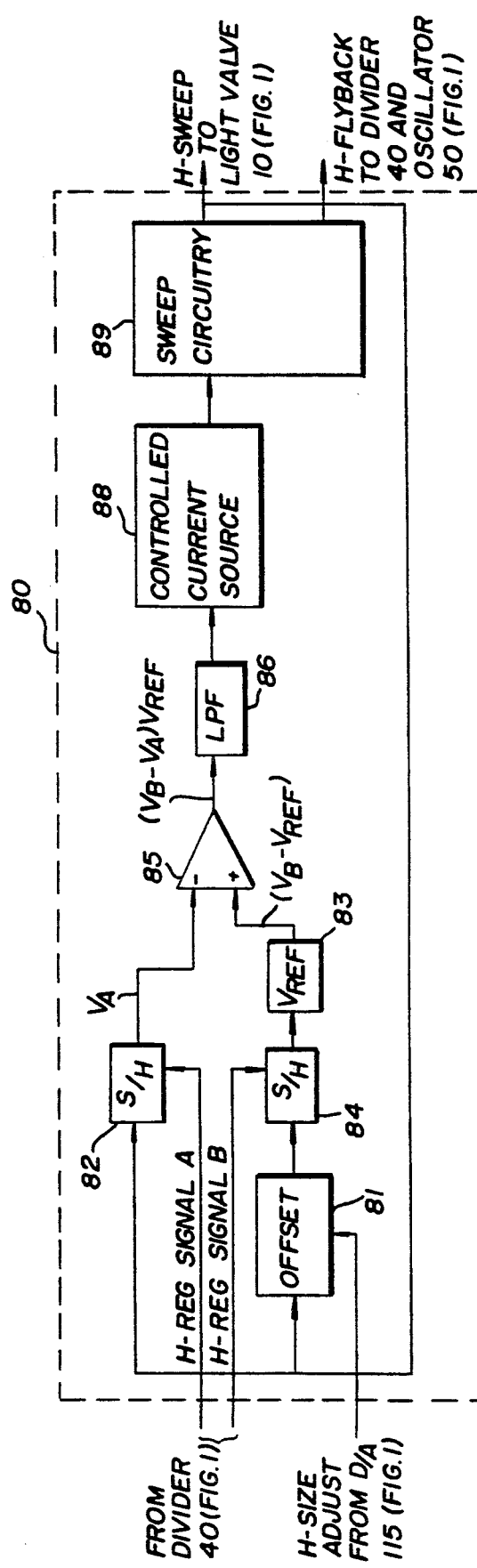
FIG. 6 is a block diagram of the H-sweep generator means of FIG. 1.

Referring to FIG. 6, a block diagram of the H-sweep generator of FIG. 1 is shown.

H-sweep generator means 80 include offset circuitry 81 having an input which constitutes an input of H-sweep generator means 80 for receiving the H-size adjust signal, a pair of sample and hold (S/H) circuitry 82 and 84 having a first input, which constitute respective other inputs of H-sweep generator means 80, for receiving the H-regulation signal A and B, respectively. The output of S/H circuitry 82 is connected to the inverting input of comparison means 85, such as a difference amplifier. A reference voltage means 83 has an input connected to the output of S/H circuitry 84 and an output connected to the non-inverting input of amplifier 85. A controlled current source 88 has an input connected to the output of low pass filter (LPF) circuitry 86 which in turn has an input connected to the output of amplifier 85. Sweep circuitry 89 has an input connected to the output of current source 88. Sweep circuitry 89 also has an output with the H-sweep signal available thereat, and which constitutes an output of sweep generator 80, connected to another input of offset circuitry 81 and to a second input S/H circuitry 82. The output of offset circuitry 81 is connected to a second input of S/H circuitry 84.

In operation, S/H circuitry 82 and 84 monitor the value of the signal provided to the respective second input thereof and at a predetermined time during the interval of the respective A and B pulses of the corresponding H-regulation A and B signals. The value of the signal at the second input of S/H circuitry 82 and 84 is transferred to the corresponding output where it is maintained until update at a next occurrence of the corresponding H-regulation signal A or B. Reference voltage means 83 subtracts a predetermined voltage value $V_{REF}$ such as may be obtained from a Zener diode, to the signal available at the output of S/H circuitry 84 and provides a difference signal having a value resulting from the subtraction to the non-inverting input of amplifier 85. The reference voltage $V_{REF}$ is selected to be the desired difference between voltage $V_B$ and voltage $V_A$ for a cycle of the H-sweep signal.

Amplifier 85 takes the value of the signal available at its non-inverting input, subtracts from it the value of the signal available at is inverting input and provides a signal having a value representing such difference at its output. That is, the value of the signal available at the output of amplifier 85 may be represented by $(V_{BX}-V_{REF},$ wherein X represents the appropriate cycle of the H-sweep signal. Desirably the value of $(V_b-V_A)-V_{REF}$ will be zero for achieving optimum H-size regulation.

The filtered signal from LPF circuitry 86 is supplied to current source 88. The value of the filtered signal determines how much current will be provided at the output of current source 88 and supplied to sweep circuitry 89. The more current supplied to sweep circuitry 89, the steeper will be the slope of the H-sweep signal (FIG. 3) that is available at the output of sweep circuitry 89. The H-sweep signal is also provided to offset circuitry 81 and S/H circuitry 82 as an indication of the length of a previous raster sweep line so that sweep circuitry 80 can regulate, or control, the length of a next raster sweep line.

At the end of each cycle of the H-sweep signal, H-sweep generator circuitry 89 provides the H-flyback signal which is available at another output of H-sweep generator circuitry 89 that also constitutes another output of H-sweep generator means 80.

The H-size adjust signal that is supplied to offset circuitry 81 controls the amount of voltage to be added or subtracted from the H-sweep signal before the resultant signal is provided to S/H circuitry 84.

Referring to FIG. 7, a perspective diagram of a plurality of light valve projectors which may beneficially employ the present invention is shown.

Light valve projection apparatus 10a and 10b, which each include horizontal size control and color control circuitry in accordance with the present invention, are directed to project an image onto respective portions 12a and 12b of a viewing surface, such as a rear projection screen 12. The right vertical edge (as viewed in the direction of projection from the projector), or ending, of the horizontal sweeps from projector 10a is set to abut and be registered with the left vertical edge, or beginning, of the horizontal sweeps from projector 10b along vertical axis 15. The horizontal size and color rendition of the display from projector 10a and 10b for maintaining constant horizontal size and proper, or desired, color rendition may be adjusted and controlled for each of projector 10a and 10b as described above in accordance with the present invention.

Thus has been illustrated and described apparatus and method for maintaining a constant horizontal size of an image generated by light valve projection apparatus. Also shown and described is apparatus and method for maintaining such constant horizontal size while also maintaining proper and/or desired color rendition of a n image to be displayed.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In a video projection system, apparatus for establishing a horizontal size of a display raster in response to information for a display to be presented, the information including synchronization data indicative of a desired horizontal size of the display raster, comprising:

first reference signal generating means having an output and for generating a first reference signal having a predetermined frequency;

divider means having an input coupled to the output of the reference signal generating means for receiving the first reference signal, the divider means further for dividing down the first reference signal in response to the synchronization data for forming a secondary reference signal;

counter means for counting a predetermined number of cycles of the secondary reference signal, the counter means further for generating a first sampling signal after a first predetermined number of cycles and for generating a second sampling signal after a second predetermined number of cycles of the secondary reference signal; and horizontal sweep generator means for generating a horizontal sweep signal in response to the first and second sampling signal, wherein the horizontal sweep signal is indicative of the horizontal size of the display raster.

2. The apparatus as in claim 1, wherein the divider means include a programmable divider and further wherein the apparatus includes microcontroller means for generating divider control signals for programming the programmable divider in response to the synchronization data.

3. The apparatus as in claim 2, further including operator control means for generating operator command signals, the microcontroller means further for generating the divider control signals in response to the operator command signals.

4. The apparatus as in claim 2, wherein the microcontroller means further for effectively altering the time interval between the first and second sampling signals for effecting a change in the horizontal sweep signal.

5. The apparatus as in claim 1, further comprising:
second reference signal generating means having an output and for generating a second reference signal having a predetermined frequency;

switch means having first and second input ports and an output port that may be selectably connected to either the first or second input port, the first input port connected to the output of the first reference signal generating means for receiving the first reference signal, the second input port connected to the output of the second reference signal generating means for receiving the second reference signal, and the output port connected to the input of the divider means so that the switch means is connected between the output of the first reference means and the input of the divider means;

microcontroller means for controlling the frequency of the second reference signal to regulate the horizontal size of the display raster when the output of the second reference signal generating means is connected to the input of the divider means.

6. The apparatus as in claim 1, further comprising:

second reference signal generating means having an output and for generating a second reference signal having a predetermined frequency;

switch means having first and second input ports and an output port that may be selectably connected to either the first or second input port, the first input port connected to the output of the first reference signal generating means for receiving the first reference signal, the second input port connected to the output of the second reference signal generating means for receiving the second reference signal, and the output port connected to the input of the divider means so that the switch means is connected between the output of the first reference means and the input of the divider means;

frequency control means for controlling the frequency of the second reference signal to regulate color rendition for the display when the output of the first reference signal generating means is connected to the input of the divider means.

7. The apparatus as in claim 6, wherein the microcontroller means further for controlling the horizontal size of the display raster when the output of the first reference signal generating means is connected to the input of the divider means.

8. In a video projection system, a method for establishing a horizontal size of a display raster, comprising:

receiving a series of synchronization signals responsive to a video signal to be displayed, the interval between predetermined synchronization signals indicative of the length of a horizontal line of the raster;

dividing down the frequency of a first reference frequency signal to form a secondary reference signal;

generating a first and second sampling signal after a respective first and second predetermined number of cycles of the secondary reference signal; and generating a horizontal sweep signal in response to the first and second sampling signal, wherein the horizontal sweep signal is indicative of the horizontal size of the display raster.

9. The method as in claim 8, wherein the step of dividing includes dividing down in response to the synchronization signals.

10. The method as in claim 9, wherein the step of dividing further includes dividing down in response to operator commands.

11. The method as in claim 8, further including effectively modifying a detected interval between the first and second sampling signal for controlling the slope of the horizontal sweep signal.

12. The method as in claim 11, further including:
providing a second reference frequency signal for an RF carrier signal to be modulated for displaying the video signal, and adjusting the frequency of the second reference frequency signal for controlling color rendition of the displayed video signal.

* * * * *